United States Patent
Cunningham et al.

(10) Patent No.: US 11,248,997 B2
(45) Date of Patent: Feb. 15, 2022

(54) DISSOCIATEDLY FABRICATED GRIPS FOR ADDITIVELY MANUFACTURED COUPONS AND METHODS

(71) Applicant: The Boeing Company, Chicago, IL (US)

(72) Inventors: Cory Clawson Cunningham, Auburn, WA (US); Troy Allan Haworth, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 208 days.

(21) Appl. No.: 16/586,894

(22) Filed: Sep. 27, 2019

(65) Prior Publication Data

US 2021/0096047 A1    Apr. 1, 2021

(51) Int. Cl.
*G01N 3/62* (2006.01)
*G01N 3/02* (2006.01)

(52) U.S. Cl.
CPC ............ *G01N 3/02* (2013.01); *G01N 3/62* (2013.01)

(58) Field of Classification Search
CPC .................... G01N 3/02; G01M 7/02
See application file for complete search history.

(56) References Cited

U.S. PATENT DOCUMENTS

| | | | | |
|---|---|---|---|---|
| 4,686,860 A * | 8/1987 | Liu | ........................ | G01N 3/04 73/837 |
| 5,284,063 A * | 2/1994 | Newell | .................... | G01N 3/08 73/822 |
| 5,528,942 A * | 6/1996 | Baratta | .................... | G01N 3/02 73/818 |
| 7,360,442 B2 * | 4/2008 | Broadley | ............... | G01N 3/068 702/42 |
| 9,046,450 B2 * | 6/2015 | Lee | ......................... | G01N 3/08 |
| 9,063,035 B2 * | 6/2015 | Kismarton | ............... | G01N 3/04 |
| 2014/0234571 A1 * | 8/2014 | Lee | ......................... | G01N 3/08 428/80 |
| 2014/0352451 A1 * | 12/2014 | Kismarton | ............... | G01N 3/08 73/826 |
| 2015/0308935 A1 * | 10/2015 | Dietrich | .................. | B29C 64/40 264/40.1 |
| 2017/0097280 A1 * | 4/2017 | Drescher | ............... | G01M 7/022 |
| 2018/0345381 A1 * | 12/2018 | Srinivasan | ............. | B22F 10/28 |
| 2018/0356322 A1 * | 12/2018 | Slaughter | ................. | G01N 3/28 |

* cited by examiner

*Primary Examiner* — Paul M. West
*Assistant Examiner* — Mark A Shabman
(74) *Attorney, Agent, or Firm* — Haynes and Boone, LLP

(57) ABSTRACT

A manufacturing method that includes fabricating a component using an additive manufacturing process, and fabricating a coupon using the additive manufacturing process. The coupon includes a main portion and a grip portion. Fabrication of the coupon includes fabricating the main portion concurrently with the fabrication of the component, fabricating the grip portion dissociatedly from the fabrication of the component, and coupling a first end of the main portion with the grip portion to form the coupon.

20 Claims, 7 Drawing Sheets

DISSOCIATEDLY FABRICATED GRIPS FOR ADDITIVELY MANUFACTURED COUPONS AND METHODS

TECHNICAL FIELD

The present application generally relates to additive manufacturing, and more particularly to dissociatedly fabricated grips for additively manufactured coupons and methods.

BACKGROUND

Testing of manufactured components ensures reliability of the product and that certain quality standards at met. Various organizations such as, American Society of Testing and Materials (ASTM), International Organization for Standardization (ISO), and National Institute of Standards and Technology (NIST), among others, have established standards to perform such reliability testing. The techniques provided in the present disclosure are directed to methods and systems for improving additive manufacturing processes and testing the components thus manufactured.

SUMMARY

According to a first example, a manufacturing method is described. The method includes: fabricating a component using an additive manufacturing process; and fabricating a coupon using the additive manufacturing process, the coupon including a main portion and a grip portion, wherein the fabricating the coupon includes: fabricating the main portion concurrently with the fabricating of the component; fabricating the grip portion dissociatedly from the fabricating of the component; and coupling a first end of the main portion with the grip portion to form the coupon.

According to a second example, an additively manufactured coupon is described. The coupon may be manufactured according to a method including: fabricating a component using an additive manufacturing process; and fabricating a coupon using the additive manufacturing process, the coupon including a main portion and a grip portion, wherein the fabricating the coupon includes: fabricating the main portion concurrently with the fabricating of the component; fabricating the grip portion dissociatedly from the fabricating of the component; and coupling a first end of the main portion with the grip portion to form the coupon.

According to a third example, a system is described, that includes: an additively manufactured component; an additively manufactured coupon for testing the component, the coupon including: a main portion; a first grip portion coupled with a first end of the main portion; a second grip portion coupled with a second end of the main portion, wherein the main portion and the component being fabricated concurrently using the same additive manufacturing device and the same additive manufacturing process; and wherein the first grip portion and the second grip portion are fabricated dissociatedly from the fabrication of the main portion.

According to a fourth example, a method of performing quality control for the additively manufactured component is described. The method may include performing a materials test for the additively manufactured component using the coupon that includes: a main portion; a first grip portion coupled with a first end of the main portion; a second grip portion coupled with a second end of the main portion, wherein the main portion and the component being fabricated concurrently using the same additive manufacturing device and the same additive manufacturing process; and wherein the first grip portion and the second grip portion are fabricated dissociatedly from the fabrication of the main portion.

The scope of the invention is defined by the claims, which are incorporated into this section by reference. A more complete understanding of examples of the invention will be afforded to those skilled in the art, as well as a realization of additional advantages thereof, by a consideration of the following detailed description of one or more examples. Reference will be made to the appended sheets of drawings that will first be described briefly.

Figure 2:
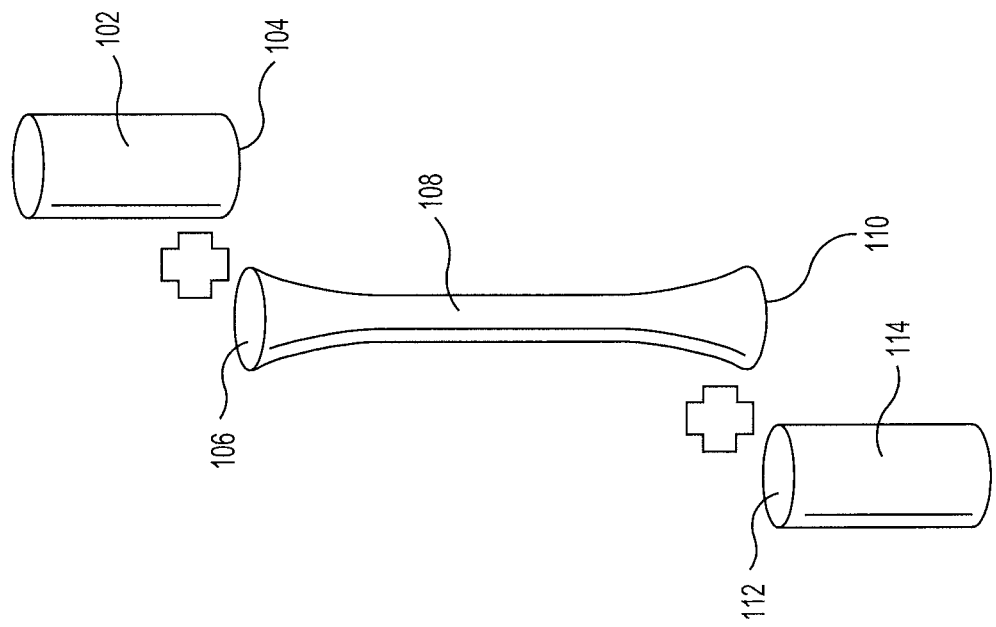
FIG. 2 is an exploded perspective view of the coupon fabricated according to an example of the present disclosure.

Examples of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, examples will be described in more detail with reference to the accompanying drawings. The present invention, however, may be embodied in various different forms, and should not be construed as being limited to only the illustrated examples herein. Rather, they are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

Materials testing of manufactured components is important in manufacturing to ensure reliability of systems that are built using such components. It is particularly important in additive manufacturing because customers and end users demand validation of the material properties, as well as for stability validation of the additive manufacturing process. For example, fatigue testing of materials may be performed on the additively manufactured material to identify susceptibility of the material to fatigue. Tensile or compression testing may be performed to identify susceptibly of the material to various tensions and compressions. Other materials tests that may be performed include but not limited to shear, static, hardness, torque, and/or bend tests.

In power bed fusion additive manufacturing, test coupons are fabricated (or printed) in the same build for testing according to some standards. Thus, for example, certain materials testing can be performed on the coupon instead of on the actual component because the coupon has the same properties as the actual component. That is, the coupon is fabricated concurrently (e.g., at the same time) with the component and such that each layer of the coupon is printed correspondingly with each layer of the component. Performance of the certain materials testing like fatigue testing may include applying a force to the component while collecting various information such as the applied pressure or the point of failure on the coupon as it is held by the testing device. Herein the present disclosure, various embodiments will be described by way of example and not of limitation, with reference to coupons for conducting fatigue tests. However, the coupons may be used for conducting any number of other materials testing that are known to those skilled in the art, which may include, but is not limited to, tensile, compression, shear, static, hardness, torque, and/or bend tests.

Figure 1:
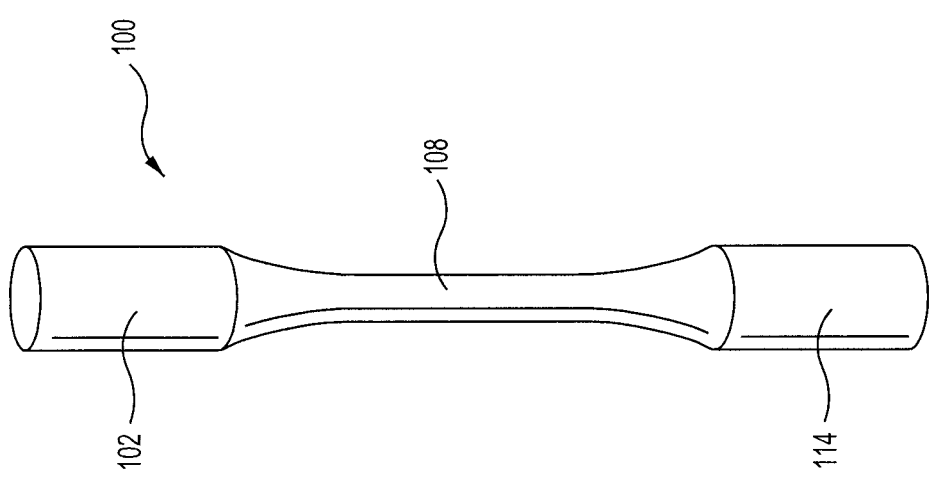
FIG. 1 is a perspective view of a coupon used for materials testing according to an example of the present disclosure.
Figures 7, 8:
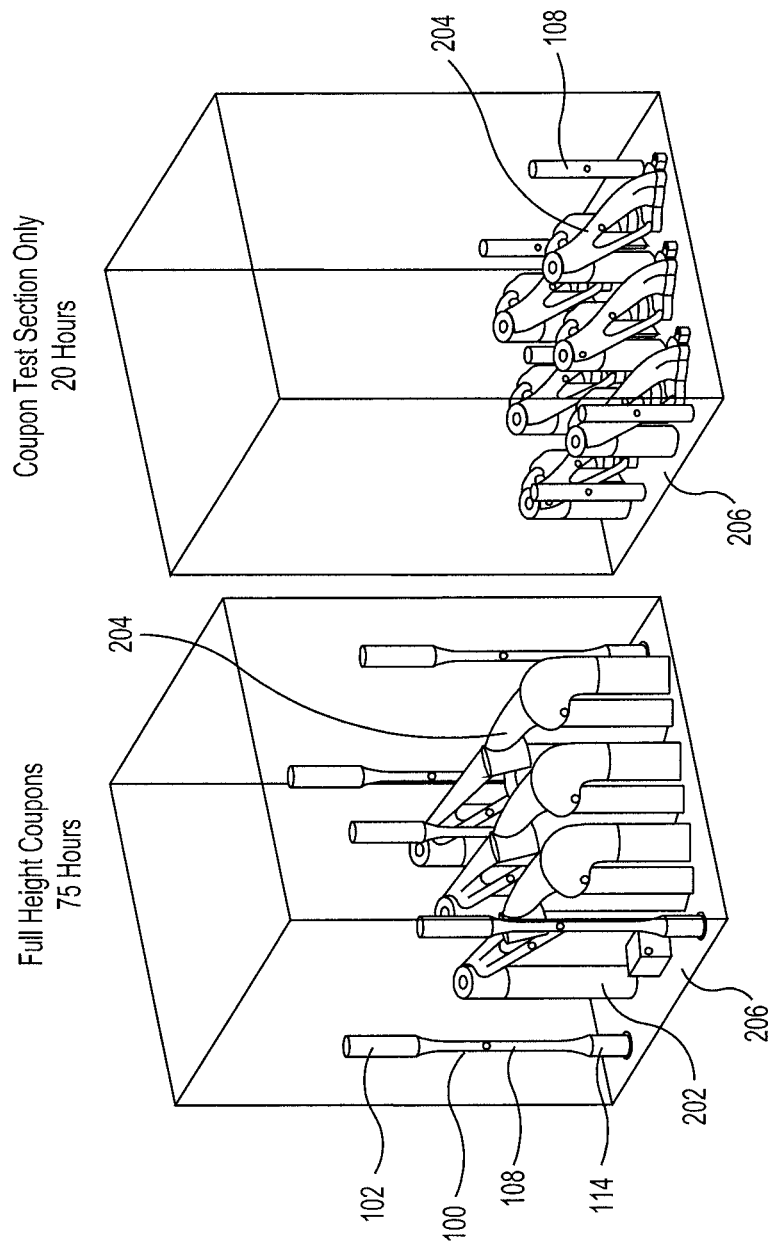
FIG. 7 is a perspective view of the fabricated coupons and components as laid out on a base plate of the additive manufacturing system when the coupon and the grip portions are fabricated together.
FIG. 8 is a perspective view of the fabricated coupons and components as laid out on a base plate of the additive manufacturing system according to an example of the present disclosure.

A fatigue coupon based on an example ASTM standard has an hourglass-like shape and requires a main portion (e.g., middle section) that is used for testing and a grip section (e.g., outer sections) on either side of the main portion to allow for the testing apparatus to grasp the coupons for testing. An example of the ASTM standard coupon is illustrated in FIG. 1 having a main portion 108 and grip portions 102, 114. Such coupon is fabricated by an additive manufacturing system together with the actual component that is being manufactured. For example, FIG. 7 illustrates a fatigue coupon 100 that was vertically fabricated by the additive manufacturing system together with the actual component 204 manufactured. Because the layers of the main portion 108 are fabricated to correspond with the layers of the component 204, fabrication of the component 204 does not start until at least the lower grip portion 114 is initially printed. In order to fabricate the component 204 starting at the same level as the main portion 108, stilts 202 are placed on the base plate 206 of the machine so that the printing of the component 204 can start at the top of the stilts 202 to align with the first layer of the main portion 108. Thus, the amount of time it takes the machine to fabricate the grip portion 114 is wasted run time because the component 204 is not being fabricated during that time. Furthermore, additional material is required for the stilts 202, and additional risk is placed in the fabrication process of the component because printing on stilts 202 increases the likelihood of causing build failures compared to printing them closer to the base plate 206. This process can be improved by fabricating the main portion 108 of the coupon and the grip portions 102, 114 of the coupon dissociatedly (e.g., separately) and then joined together after they are fabricated. Thus, the component 204 can be fabricated without stilts 202, closer to the base plate 206 because the main portion 108 is fabricated on the base plate 206 without the grip portions 102, 114. The grip portions 102, 114 can be pre-made for example, in a separate machine, and then coupled together with the main portion 108.

FIG. 2 illustrates an exploded perspective view of the hourglass-like shaped fatigue coupon 100 according to an example of the present disclosure. The main portion 108 of the coupon is substantially elongated and has a first end 106 and a second end 110. The grip portions 102, 114 may be further distinguished as a first grip portion 102 and a second grip portion 114, each having a first grip end 104 and a second grip end 112, respectively. As described earlier, the main portion 108 is fabricated by an additive manufacturing system concurrently with the actual component that is being fabricated by the same additive manufacturing system. According to example of the present disclosure, the grip portions 102, 114 may be made separately from the component. For example, the grip portions 102, 114 may be fabricated by a different additive manufacturing system or machine, or it may be fabricated using the same additive manufacturing system but at a different time in a different batch. In some examples, a batch of just the grip portions 102, 114 may be fabricated by an additive manufacturing system using the same fabrication material as the material used for the component 204 or a different fabrication material than the material used for the component 204. Furthermore, the grip portions 102, 114 may be made using traditional non-additive manufacturing techniques such molding or forging. In some examples, a batch of the grip portions 102, 114 can be pre-made and stored for use later when the main portions 108 are fabricated. As the main portions 108 are fabricated, the pre-made grip portions 102, 114 may be coupled with the main portion 108 to form a complete coupon 100 that complies with standards. More specifically, the first grip end 104 of the first grip portion 102 may be coupled with the first end 106 of the main portion 108, and the second grip end 112 of the second grip portion 114 may be coupled with the second end 110 of the main portion 108. The result is the fatigue coupon 100 as illustrated in FIG. 1 that complies with the ASTM standard to use in fatigue testing.

According to an example of the present disclosure, the grip portions 102, 114 are coupled with the main portion 108 with an adhesive that can sufficiently bond the two ends together so that they do not come apart during the fatigue test. In other examples, the grip portions 102, 114 and the main portion 108 may be coupled together using other techniques such as rotary friction welding.

Figure 3:
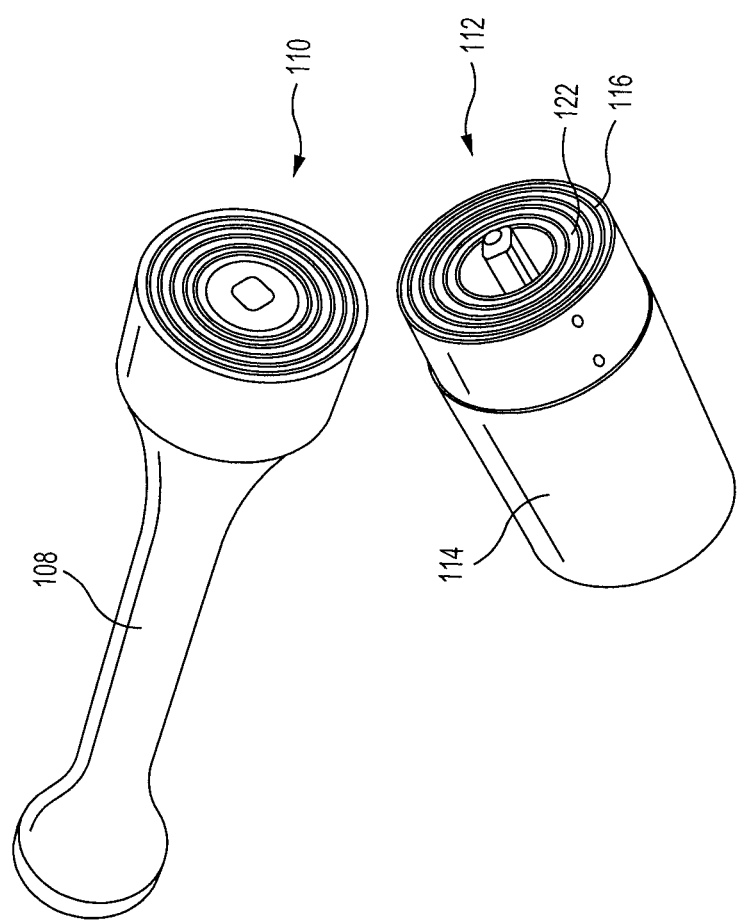
FIG. 3 is a close-up perspective view of an end of a main portion and an end of a grip portion of the coupon according to an example of the present disclosure.

FIGS. 3-6 illustrate the details of the first grip end 104, second grip end 112, and the first and second end 106, 110 of the main portion 108. More particularly, FIG. 3 is a close-up perspective view of the second end 110 of a main portion 108 and the second grip portion 114 of the coupon 100 according to an example of the present disclosure.

One example of the present disclosure includes coupling the grip portions 102, 114 with the main portion 108 using an adhesive. The strength of the adhesion can be increased by increasing the surface area of the adhesion area between the two portions. One way to increase the adhesion surface area is to include a plurality of geometric structures for the two sides to adhere to when joined. For example, a plurality of concentric ring-shaped structures can be formed at the second end 110 of the main portion, and a plurality of corresponding concentric ring-shaped structures can be formed at the second grip end 112 such that the ring-shaped structures on the two ends will be mated interleavingly when coupled. For example, the second end 110 of the main portion may be a female end and the second grip end 112 may be a male end. Alternatively, the second end 110 of the main portion may be the male end and the second grip end 112 may be the female end.

Figure 4:
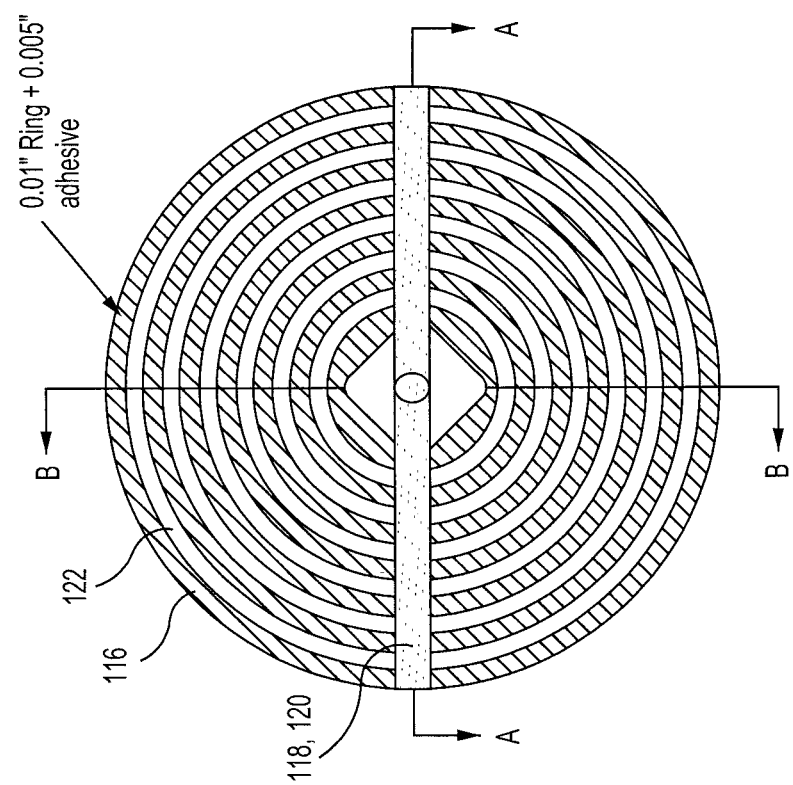
FIG. 4 is a bottom view of the end of the main portion of the coupon according to an example of the present disclosure.

FIG. 4 is a bottom view of the end of the main portion of the coupon according to an example of the present disclosure. This example includes seven concentric rings 116 with a gap 122 between each of the rings 116. The corresponding concentric rings on the second grip end 112 is configured to slidably and snuggly fit in the gap 122 at the second end 110 of the main portion 108 when coupled, and similarly, the concentric rings 116 on the main portion 108 are configured to slidably and snuggly fit in the gap of the grip portion 114. A first and a second hydraulic ports 118, 120 are fabricated in the rings 116 so that excess adhesive material applied during the coupling process and air can be forced out through the hydraulic ports 118, 120. Absence of these ports would cause excess adhesive and/or air to remain at the junction and create a weaker joint. In this manner, the surface area of each ring structure may be bonded with the corresponding ring structures, thus allowing each of those surfaces to securely bond with each other.

Figure 5:
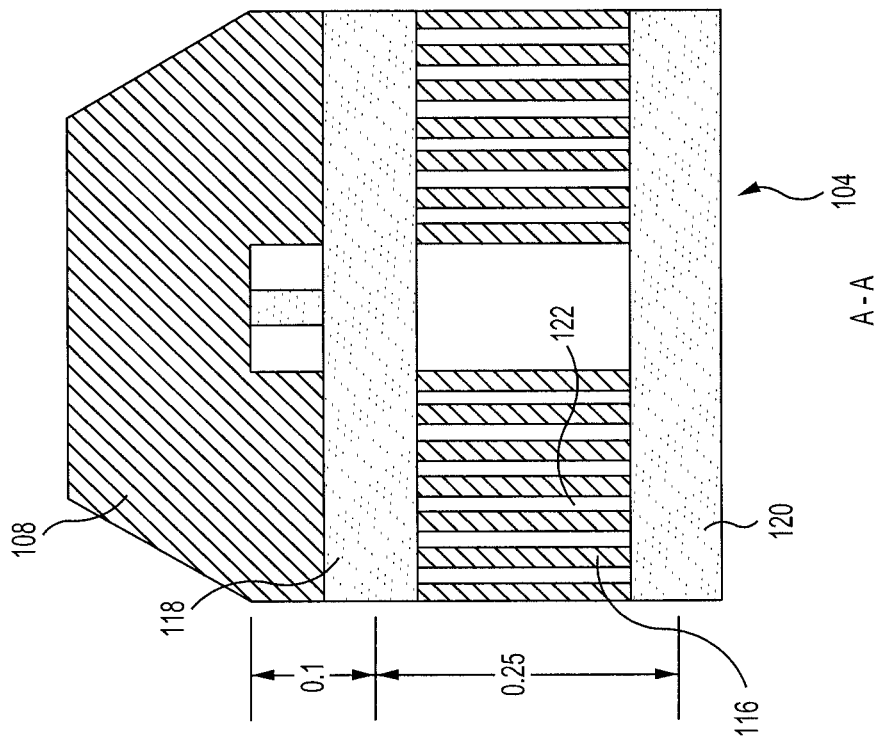
FIG. 5 is a cutout view of the end of the main portion of the coupon along the lines A-A of FIG. 4 according to an example of the present disclosure.
Figure 6:
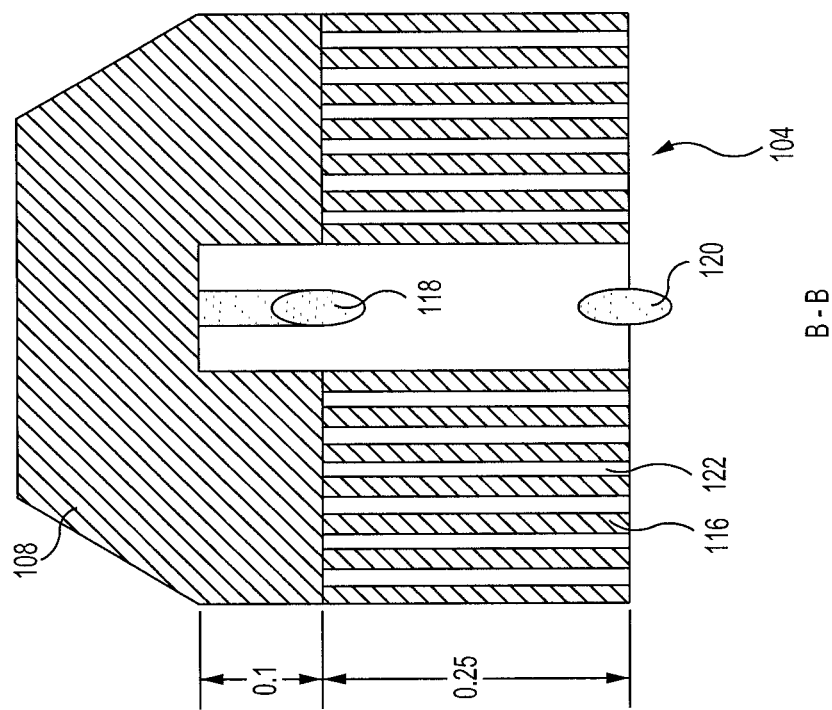
FIG. 6 is a cutout view of the end of the main portion of the coupon along the line B-B of FIG. 4 according to an example of the present disclosure.

FIG. 5 is a cutout view illustrating the end of the main portion of the coupon along the lines A-A of FIG. 4 according to an example of the present disclosure. FIG. 6 is a cutout view illustrating the end of the main portion of the coupon along the line B-B of FIG. 4 according to an example of the present disclosure. As illustrated, the first hydraulic port 118 is located closer toward the center of the coupon and the second hydraulic port 120 is located toward the end of the coupon. The first hydraulic port 118 forms a channel that runs across the center of the rings 116. Similarly, the second hydraulic port 120 forms a channel that runs across a lower portion of the rings 116. Thus, an adhesive can be applied to the rings 116 to couple the second end 110 of the main portion with the second grip end 112. As the two ends are pressed toward each other, the adhesive is spread throughout the ring 116 surfaces and the excess adhesive is forced out of the first and second hydraulic ports 118, 120.

While the end portions of the main portion 108 and the grip portions 102, 114 as illustrated in FIGS. 3-6 have the concentric ring-shaped structures, the invention according to the present disclosure is not limited to just rings. Other geometric shaped structures may be envisaged. For example, the structures may be concentric square-shaped structures or straight blade-like structures that are adapted to be interleavingly coupled with corresponding squared-shaped or blade-like structures. Various other simple or complex structures are possible, especially when fabricated using additive manufacturing techniques. While the techniques provided above discuss coupling of the geometric shapes with adhesive, it is not limited to just adhesives. For example, the two ends may be coupled by rotary friction welding of first end portion 110 and second grip end 112. Other techniques are also suitable as long as the bond is sufficiently strong to support the fatigue test procedures.

According to one example embodiment of the present disclosure, the concentric ring-shaped structures as illustrated in FIGS. 3-6 may have the following dimensions and specification:

|  |  | Male Ring OD | Male Ring ID | AVG |
|---|---|---|---|---|
| Ring OD Radius 1 | 0.235 in | 0.47 | 0.44 | 0.455 |
| Ring OD Radius 2 | 0.205 in | 0.41 | 0.38 | 0.395 |
| Ring OD Radius 3 | 0.175 in | 0.35 | 0.32 | 0.335 |
| Ring OD Radius 4 | 0.145 in | 0.29 | 0.26 | 0.275 |
| Ring OD Radius 5 | 0.115 in | 0.23 | 0.2 | 0.215 |
| Ring OD Radius 6 | 0.085 in | 0.17 | 0.14 | 0.155 |
| Ring OD Radius 7 | 0.055 in | 0.11 | 0.11 | 0.11 |
| Ring Thickness | 0.01 in | | | |
| Ring Depth | 0.25 in | | | |
| Ring Area | 2.96 in^2 | | | |
| Adhesive Operation Shear Stress | 829 psi | | | |
| Grip Radius | 0.25 in | | | |
| Adhesive Thickness | 0.005 in | | | |
| Section Stress | 50000 psi | | | |
| Section Radius | 0.125 in | | | |
| Section Area | 0.0491 in^2 | | | |
| Target Load | 2454 lbs | | | |
| Lap Shear Allowable | 1000 psi | | | |
| Required Shear Area | 2.45 in^2 | | | |

Figure 9:
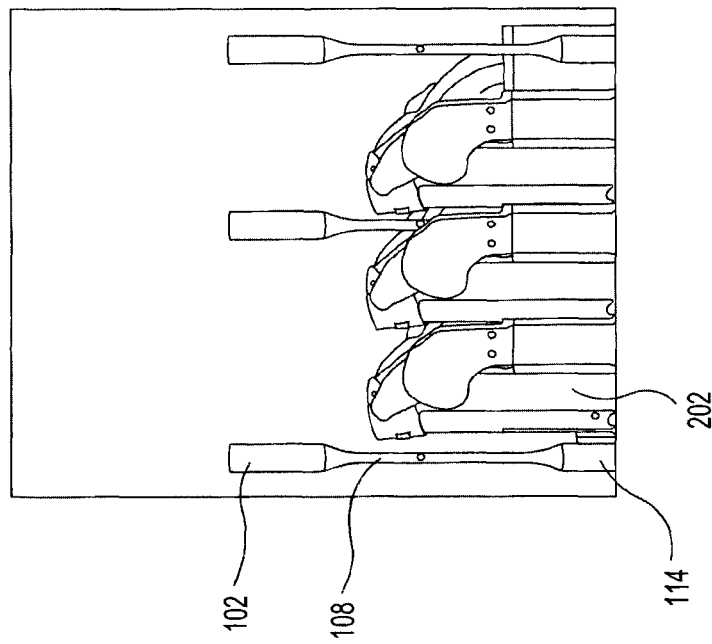
FIG. 9 is an elevation view of the fabricated coupons and components as laid out on a base plate of the additive manufacturing system when the coupon and the grip portions are fabricated together according to an example of the present disclosure.

FIG. 7 is a perspective view and FIG. 9 is an elevation view showing the printing chamber 208 of the additive manufacturing system where the main portion 108 and the grip portions 102, 114 of the coupon 100 are fabricated in the same fabrication process (e.g., as a single monolithic coupon instead of in separate sections). A base plate 206 is disposed at the bottom of the chamber 208 where the printing takes place. Because powder bed fusion type additive manufacturing system starts from the bottom layer and works its way up, the second grip portion 114 (e.g., the lower grip portion) is printed first, followed by the main portion 108, and then the first grip portion 102. As previously explained, each of the layers of the main portion 108 are fabricated concurrently with each layer of the component 204 in order to comply with certain standards for testing (e.g., ASTM E466 for fatigue testing). According to this example, stilts 202 are provided on the base plate 206 and the components 204 are fabricated on the stilts 202 such that the first layer of the component 204 (e.g., the lowest layer) has a corresponding layer of the main portion 108 of the coupon. In other words, the fabrication of the main portion 108 and the component 204 takes place concurrently and at the same height. When the last layer of the component 204 is printed (e.g., the highest layer as oriented in FIGS. 7 and 9), the first grip portion 102 is printed to complete the fabrication process for the coupon 100. In some examples, it can take about 75 hours to complete this additive manufacturing process. Thus, while the first and second grip portions 102, 114 are being fabricated, the component 204 cannot be fabricated, which wastes run-time of the additive manufacturing system. Thus, the grip portions 102, 114 can be fabricated separately, e.g., in a separate process, to reduce the amount of run-time that is wasted in fabricating non-component products such as the coupons 100, thus freeing up the additive manufacturing machine to begin fabricating the next batch of components 204. The example illustrated in FIGS. 8 and 10 demonstrate a solution to this problem, where the fabricating of the same components can be accomplished in about 20 hours compared to about 75 hours.

Figure 10:
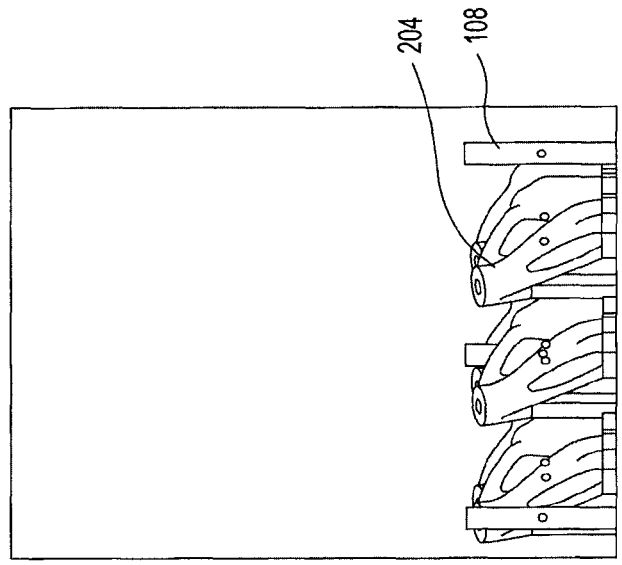
FIG. 10 is an elevation view of the fabricated coupons and components as laid out on a base plate of the additive manufacturing system according to an example of the present disclosure.

FIG. 8 is a perspective view and FIG. 10 is an elevation view showing the same printing chamber 208 of the additive manufacturing system that was illustrated in FIGS. 7 and 9, except the grip portions 102, 114 are not fabricated in this chamber 208 with the main portion 108, according to an example of the present invention. Here, the main portion 108 of the coupon 100 is fabricated concurrently with the components 204 starting at (or near) the base plate 206 without the grip portions 102, 114 or the stilts 202. As previously explained, the grip portions 102, 114 can be fabricated in a different batch, e.g., using a different machine or at a different time. Thus, when just the main portion 108 (together with the components 204) are fabricated, they can be removed from the chamber 208 and the grip portions 102, 114 can be coupled with the main portion 108 to form a complete coupon 100 that meets testing standards. In the meantime, the additive manufacturing system can begin printing the next batch of components 204 and coupons 100, thus drastically increasing the yield. In this example, almost four times the number of components 204 and coupons 100 may be fabricated in the same amount of time as it would take according to the technique illustrated in FIGS. 7 and 9. Moreover, by printing the components 204 directly on the base plate 206, or at least much closer to the base plate 206 without using the stilts 202, stability is increased thus reducing the possibility and likelihood of fabrication defects. Additionally, by fabricating the grip portions 102, 114 separately from the main portion 108, the overall height requirement of the additive manufacturing system may be reduced. Thus, a smaller additive manufacturing system machine may be used, which may be beneficial if space is a constraint. Moreover, smaller equipment may be less expensive, thus reducing capital cost of purchasing or leasing the system.

In some examples, manufacturing costs may be further reduced by using less expensive material to fabricate the grip portions 102, 114. For example, the grip portions 102, 114 are used to hold the main portion 108 in the appropriate position during testing, but the tests are not performed on the grip portions 102, 114. Thus, lower quality alloys or out-of-specification material that may not necessarily be acceptable for fabricating the main portion 108 may be sufficient to fabricate the grip portions 102, 114.

In other examples, the grip portions 102, 114 may be reused. For example, an adhesive that is bondable and de-bondable may be used to couple the main portion 108 with the grip portions 102, 114. Thus, when the fatigue test is complete, the grip portions 102, 114 may be removed and reused for testing another main portion 108 of a coupon 100.

Figure 11:
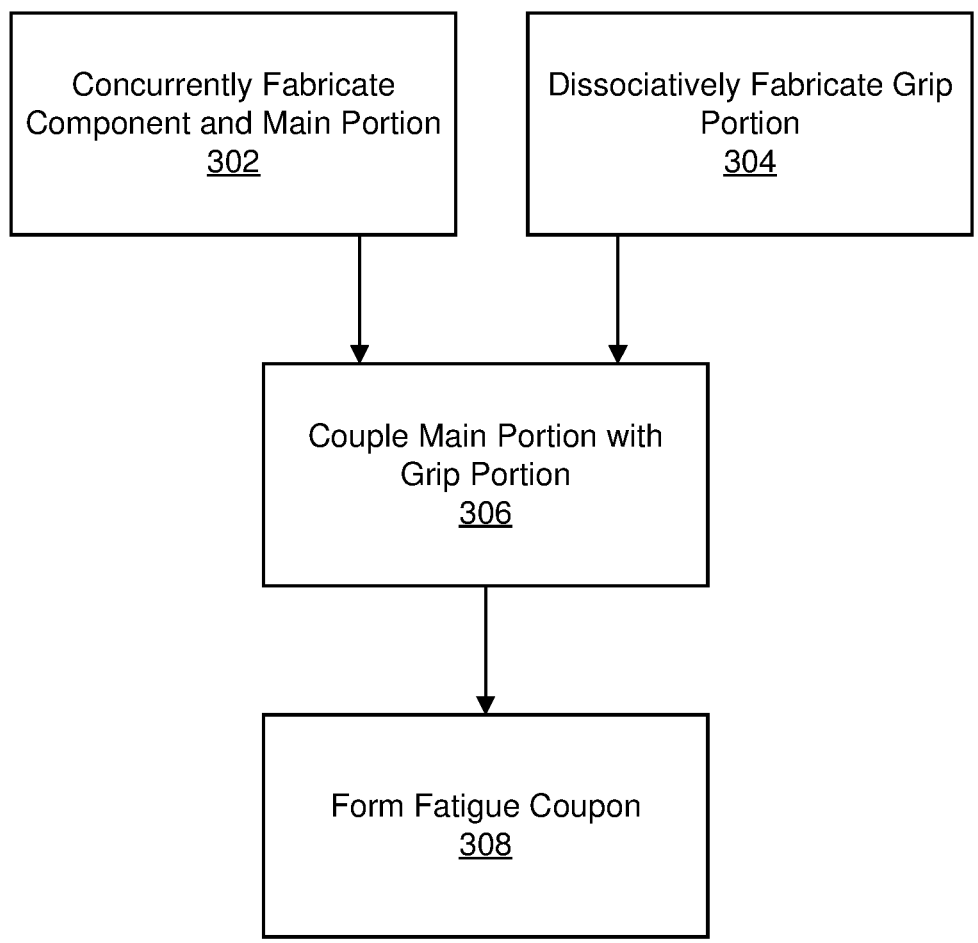
FIG. 11 is a flow chart illustrating the additive manufacturing process according to an example of the present disclosure.

FIG. 11 is a flow chart illustrating the additive manufacturing process according to an example of the present disclosure. In this example process, the component and the main portion of the fatigue coupon are fabricated concurrently so that each fabricated layer of the component has a corresponding fabricated layer of the main portion of the coupon (302). Dissociatedly from the fabrication of the component and the main portion, the grip portions of the coupon are fabricated (304). Once the main portion and the grip portion have been fabricated, they are coupled together with an adhesive or other suitable bonding technique such as, for example, rotary friction welding (306). A complete fatigue coupon that may be used to perform fatigue testing according to standards (e.g., ASTM standard) is formed when the main portion is coupled with the grip portions (308).

In this manner, coupons for materials testing may be additively manufactured by dissociatedly fabricating the grip portion from the main portion. In doing so, the overall additive manufacturing process may be performed more efficiently and reducing wasted run time of the additive manufacturing machines and systems. Moreover, although fatigue coupons and fatigue testing are provided as examples throughout the present disclosure, the embodiments of the present invention are not limited to fatigue coupons and fatigue testing. Instead, the coupons may include other coupons used for various materials testing, such as, for example, tensile test, compression test, shear test, static test, hardness test, torque test, bend test, and/or other materials tests as would be understood by a person having ordinary skill in the art.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular examples and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing examples of the present invention refers to "one or more examples of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Examples described herein are exemplary only. One skilled in the art may recognize various alternative examples from those specifically disclosed. Those alternative examples are also intended to be within the scope of this disclosure. As such, the examples are limited only by the following claims and their equivalents.

The invention claimed is:

1. A manufacturing method, comprising:
fabricating a component using an additive manufacturing process; and
fabricating a coupon using the additive manufacturing process, the coupon comprising a main portion and a grip portion,
wherein the fabricating the coupon comprises:
  fabricating the main portion concurrently with the fabricating of the component;
  fabricating the grip portion dissociatedly from the fabricating of the component; and
  coupling a first end of the main portion with the grip portion to form the coupon;
wherein the first end of the main portion comprises a geometric structure configured to be coupled with a corresponding geometric structure of the grip portion; and
wherein the geometric structure of the first end of the main portion and the geometric structure of the grip portion comprises a hydraulic port configured to release excess adhesive in response to the coupling the main portion with the grip portion.

2. The method of claim 1, wherein the fabricating the main portion concurrently comprises fabricating each layer of the main portion with a corresponding layer of the component at the same time using the same additive manufacturing process.

3. The method of claim 1, wherein the coupling the main portion with the grip portion comprises applying an adhesive between the main portion and the grip portion.

4. The method of claim 1, wherein the hydraulic port is one of two hydraulic ports in the geometric structure of the first end of the main portion, the two hydraulic ports being at respective different distances from the first end, each of the two hydraulic ports being configured to release excess adhesive in response to the coupling the main portion with the grip portion.

5. The method of claim 1, wherein the coupon is selected from the group consisting of: a fatigue test coupon, a tensile test coupon, a compression test coupon, a shear test coupon, a static test coupon, a hardness test coupon, a torque test coupon, and a bend test coupon.

6. The method of claim 1, wherein the fabricating the grip portion further comprises using a fabrication material different from a fabrication material used for the fabricating the main portion.

7. The method of claim 1, wherein:
the grip portion comprises a first grip portion and a second grip portion; and
the coupling the main portion with the grip portion further comprises:
  coupling the first end of the main portion with the first grip portion; and
  coupling a second end of the main portion with the second grip portion.

8. An additively manufactured coupon manufactured according to the method of claim 1.

9. A manufacturing method, comprising:
fabricating a component using an additive manufacturing process; and
fabricating a coupon using the additive manufacturing process, the coupon comprising a main portion and a grip portion,
wherein the fabricating the coupon comprises:
  fabricating the main portion concurrently with the fabricating of the component;
  fabricating the grip portion dissociatedly from the fabricating of the component; and
  coupling a first end of the main portion with the grip portion to form the coupon;
wherein the first end of the main portion comprises a geometric structure configured to be coupled with a corresponding geometric structure of the grip portion; and
wherein the geometric structure comprises a plurality of concentric ring-shaped structures.

10. The method of claim 9, wherein the plurality of concentric ring-shaped structures of the first end of the main portion is configured to be interleaved with the plurality of concentric ring-shaped structures of the grip portion.

11. The method of claim 9, wherein the geometric structure of the first end of the main portion and the geometric structure of the grip portion comprises a hydraulic port configured to release excess adhesive in response to the coupling the main portion with the grip portion.

12. A system, comprising:
an additively manufactured component;
an additively manufactured coupon for testing the component, the coupon comprising:
  a main portion;
  a first grip portion coupled with a first end of the main portion;
  a second grip portion coupled with a second end of the main portion,
wherein the main portion and the component are fabricated concurrently using the same additive manufacturing device and the same additive manufacturing process;
wherein the first grip portion and the second grip portion are fabricated dissociatedly from fabricating the main portion;
wherein the first end of the main portion comprises a geometric structure coupled with a corresponding geometric structure of the first grip portion; and
wherein the geometric structure of the first end of the main portion and the geometric structure of the first grip portion comprises a hydraulic port configured to release excess adhesive in response to the first end of the main portion being coupled with the first grip portion.

13. The system of claim 12, wherein each layer of the main portion is fabricated at the same time with a corresponding layer of the component.

14. The system of claim 12, wherein:
the second end of the main portion comprises a geometric structure coupled with a corresponding geometric structure of the second grip portion.

15. The system of claim 14, wherein each of the geometric structure of the first end of the main portion and the geometric structure of the second end of the main portion comprises a plurality of concentric ring-shaped structures.

16. The system of claim 15, wherein:
the plurality of concentric ring-shaped structures of the first end of the main portion is configured to be interleaved with the plurality of concentric ring-shaped structures of the first grip portion; and
the plurality of concentric ring-shaped structures of the second end of the main portion is configured to be interleaved with the plurality of concentric ring-shaped structures of the second grip portion.

17. The system of claim 14, wherein:
the geometric structure of the second end of the main portion and the geometric structure of the second grip portion comprises a hydraulic port configured to release excess adhesive in response to the second end of the main portion being coupled with the second grip portion.

18. The system of claim 12, wherein the coupon is selected from the group consisting of: a fatigue test coupon, a tensile test coupon, a compression test coupon, a shear test coupon, a static test coupon, a hardness test coupon, a torque test coupon, and a bend test coupon.

19. The system of claim 12, wherein the main portion is fabricated using a material different from a material used to fabricate the first grip portion and the second grip portion.

20. A method of performing quality control for the additively manufactured component, the method comprising performing a materials test for the additively manufactured component using the coupon of claim 12.

\* \* \* \* \*